United States Patent [19]

Loring

[11] Patent Number: 4,922,762
[45] Date of Patent: May 8, 1990

[54] TENSIONING GAUGE FOR SAW BLADES

[75] Inventor: David A. Loring, North Hollywood, Calif.

[73] Assignee: Anthony R. Billson, Yorba Linda, Calif. ; a part interest

[21] Appl. No.: 341,165

[22] Filed: Apr. 21, 1989

[51] Int. Cl.$^5$ .............................................. G01L 5/10
[52] U.S. Cl. ................................. 73/862.48; 340/668
[58] Field of Search ........... 73/862.42, 862.45, 862.47, 73/862.48, 81; 33/552; 340/668

[56] References Cited

U.S. PATENT DOCUMENTS

| | | | |
|---|---|---|---|
| 2,787,159 | 4/1957 | Tammen | 73/862.47 |
| 3,296,857 | 1/1967 | Kaczeus | 73/862.47 X |
| 3,572,110 | 3/1971 | James et al. | 340/668 X |
| 3,969,713 | 7/1976 | Bossler, Jr. | 340/668 X |
| 4,324,049 | 4/1982 | Blose | 33/552 X |

Primary Examiner—Charles A. Ruehl
Attorney, Agent, or Firm—Donald A. Streck

[57] ABSTRACT

Methods and associated apparatus for adjusting the tension in a bowable member using a gauge having an indicator activated upon the gauge being pressed against a resistance having a threshold force. The gauge includes calibrating apparatus for adjusting the threshold force. The member is held in adjustable tension-applying apparatus. The method comprises the steps of operating the calibrating apparatus so that the threshold force corresponds to a desired level of tension in the member and pressing the tensioning gauge and the member together to cause the member to bow while operating the tensioning apparatus to reduce the tension until the indicating apparatus is not active. and then operating the tensioning to increase the tension until the indicating apparatus is active. In an alternate configuration, the gauge has a plurality of tangs arranged in a line and indicators indicating the number of the tangs being pressed to an activating position and the method comprises the steps of pressing the gauge and the member together to cuase the member to bow and observing the indicators while operating the tensioning apparatus to reduce the tension until a number less than a selected number of the tangs is pressed against threshold forces to the activating position and then operating the tensioning apparatus to increase the tension until the selected number of the tangs are pressed against threshold forces to the activating position.

18 Claims, 1 Drawing Sheet

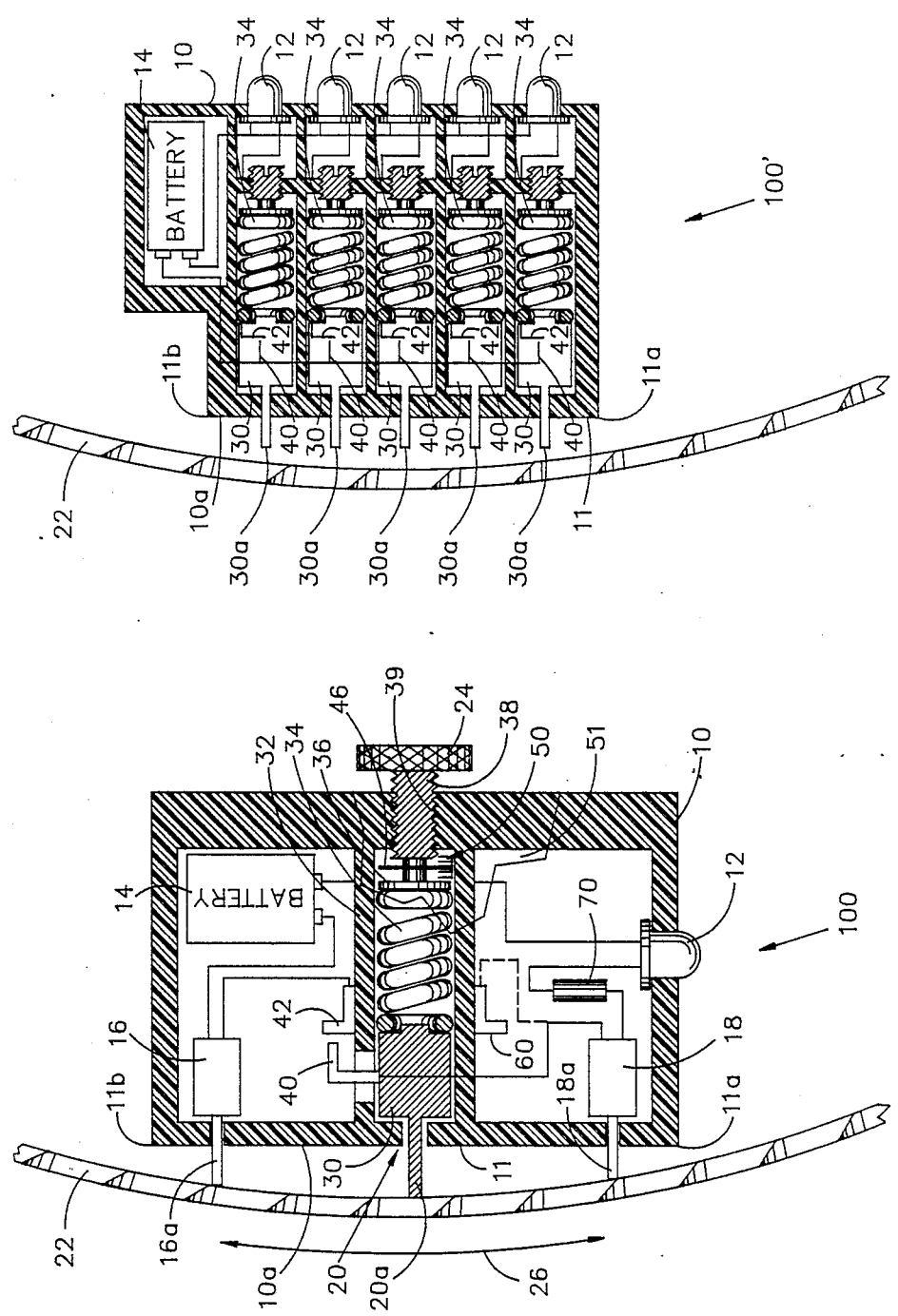

ved from an extended position toward an activating position for activating the indicator means when the tang means is depressed to the activating position; adjustable bias means for biasing the tang means towards the extended position; and depression force calibrating means for adjusting the force required to depress the tang means to the activating position by changing a biasing force of the bias means, whereby the member bows upon being pressed against the tang means so that the tang means is not depressed to its activating position unless the member is held under at least an amount of tension proportional to the biasing force of the bias means.
TENSIONING GAUGE FOR SAW BLADES

BACKGROUND OF THE INVENTION

The invention relates to apparatus for sensing and adjusting the tension in a band saw blade, scroll saw blade, drive belt, fan belt, chain drive, and the like, and, more particularly, to a tensioning gauge for measuring the tension under which an elongated flexible member such as a saw blade is held wherein the tensioning gauge comprises, indicator means; tang means depressible from an extended position toward an activating position for activating the indicator means when the tang means is depressed to the activating position; adjustable bias means for biasing the tang means towards the extended position; and depression force calibrating means for adjusting the force required to depress the tang means to the activating position by changing a biasing force of the bias means, whereby the member bows upon being pressed against the tang means so that the tang means is not depressed to its activating position unless the member is held under at least an amount of tension proportional to the biasing force of the bias means.

Many power tools and machines have parts moving under tension which must be accurately adjusted in order for the machine or tool to operate properly. For example, in a scroll saw, a saw blade is held under tension at its two ends and a motor causes the blade to oscillate longitudinally. In a band saw, a loop saw blade passes over two wheels which can be moved apart to apply tension to the blade which moves in a constant directions as the wheels revolve. The amount of tension with which the scroll saw and band saw blades are held is critical to the proper operation of the saw, as is well known. Specifically, if a blade moves laterally too much, the operator will not be able to cut a straight line or follow a pattern. If the blade is too tight, the saw will not be able to cut tight curves or radii. This is because in cutting tight curves, the blade must cut using the sides of its teeth. The blade must flex or twist to some degree in order to allow for this necessary cutting action. The tension specified by the manufacturer for a specific blade is typically the result of extensive testing in woods ranging from very soft to extremely hard and abrasive. The exact tension setting specified by the manufacturer allows the operator to achieve all of the various cuts the blade was designed to make in the material the saw and blade are rated to cut. For this reason, a saw tension knob is provided which permits the operator to adjust the blade tension as often as necessary. Additionally, if the tension is too high a saw blade of this type will tend to break more quickly.

Two wheel or three wheel band saws have one drive wheel and one or two idler wheels. Typically, one of the idler wheels is mounted in a slide so as to be movable. When the saw tension knob is turned, the movable idler wheel moves up or down in the slide so as to increase or decrease the tension on the saw blade. The amount of movement in the slide is limited differently in band saws of different manufacturers. It is not always possible to apply sufficient tension to the blade, particularly if the blade is so long that the slide runs out of upward travel.

Some machines have a scale in the form of markings embossed in the slide to show the operator where a marker should align for various blade thicknesses. Of course, such markings are calibrated for a given blade length, which may vary significantly, particularly if the operator employs a blade sold by a different manufacturer. Also, in some instances (particularly in commercial applications where the proper tools are available) a user may buy band saw blade material in large lengths and then cut it to smaller lengths and braze the ends together to form a loop band for cutting use. The problem here is that different blades of the same type will usually vary in length. In fact, a typical band saw is designed to accomodate blade lengths which vary by as much as two inches. Therefore, replacing a worn blade with a new blade may cause the embossed scale to give a faulty reading of blade tension. Because this can cause the operator to adjust the blade tension to a value other than that specified by the manufacturer, the faulty reading decreases the performance of the saw.

Scroll saws differ from band saws in that they use standard length blades generally five or six inches long. The blades are fastened at the ends of two parallel arms or at the open end of a "C" frame. Blades used in these machines are extremely thin and very narrow. They can "bow", or move a considerable distance in their center, when cutting wood or metal. Since these machines are designed to make intricate cuts and curves, bowing causes inaccuracies in cutting the correct pattern. Accordingly, setting the blade tension accurately is critical in scroll saws as well as band saws.

Manufacturers of band saws and scroll saws generally advise users to tension the blade by increasing tension until a particular musical note can be produced by plucking the blade. Aside from the fact that few people have perfect pitch or the use of a tuning instrument to check the tone produced by the blade, different metals produce different sounds (or overtones) when held at the same tension. Thus, the typical operator has no reliable way of verifying that the blade tension equals the manufacturer's specification.

Another problem is that the operator must check the blade tension quite often, so that he cannot use awkward or time-consuming methods for checking blade tension. This is because band saws and scroll saws use a spring in the tensioning device. This spring wears over time, causing the tension to fluctuate uncontrollably. Moreover, the saw blades themselves tend to stretch over time, further complicating the fluctuation in blade tension. Thus, the operator must frequently check the saw blade tension in order to maintain the optimum saw and blade performance. The problem is that, in the prior art as it exists today, there is no reliable and efficient way of checking saw blade tension with any meaningful accuracy. Therefore, the typical operator must work with a band or scroll saw which is not operating at its optimum performance level. Similar problems exist in other tensioned devices including, but not limited to, fan belts, chain drives, and the like.

Accordingly, it is an object of the invention to provide a practical way for an operator to ensure that his band saw or scroll saw, or the like, is operating at peak performance by accurately and quickly measuring the blade tension.

It is a further object of the invention to provide a device for measuring the tension in a saw blade, or the like, without requiring the operator to employ sophisticated or acoustic instrumentation.

It is yet a further object of the invention to provide a device for quickly determining the tension in a movable member in a band saw, or the like, which is simple and easy for anyone to use.

It is an even further object of the invention to provide a device for quickly measuring the tension in a movable member in a band saw, or the like, which is very accurate.

It is a yet further object of the invention to provide a device for quickly measuring the tension in a movable member or blade in a band saw, or the like, by measuring the force required to laterally displace the member of blade.

Other objects and benefits of the invention will become apparent from the description which follows hereinafter when taken in conjunction with the drawing figures which accompany it.

SUMMARY

The foregoing objects and various other objects and advantages are realized in the invention, which is a tensioning gauge for measuring the tension under which an elongated flexible member such as a saw blade is held. The tensioning gauge comprises, indicator means; tang means depressible from an extended position toward an activating position for activating the indicator means when the tang means is depressed to the activating position; adjustable bias means for biasing the tang means towards the extended position; and depression force calibrating means for adjusting the force required to depress the tang means to the activating position by changing a biasing force of the bias means, whereby the member bows upon being pressed against the tang means so that the tang means is not depressed to its activating position unless the member is held under at least an amount of tension proportional to the biasing force of the bias means.

In the preferred embodiment, the tang means comprises a plurality of linearly aligned tangs individually depressible toward individual activating positions, the indicator means being activated only upon the plurality of tang means being simultaneously depressed to their respective activating positions, the adjustable bias means being connected to a centrally located one of the tangs.

Further in the preferred embodiment, the bias means comprises a spring having an end abutting the one tang so as to elastically oppose its travel toward its respective activating position and the depression force calibrating means comprises a screw threaded in a stationary housing towards and abutting an opposite end of the spring, whereby the force of the spring against the one tang is adjusted by rotating the screw.

The preferred embodiment also includes a plurality of electrical switches and a battery electrically connected in series with the indicator means, the plurality of tangs being arranged in a line comprising at least three the tangs with each of the tangs being connected to an activating member of a corresponding one of the plurality of electrical switches. In the preferred embodiment, the indicator means comprises a single light source connected in series with the battery and the plurality of switches whereby when the member bows upon being pressed against the tang means so as to depress to activating positions at least those individual tangs nearest each end of the line of tangs the centrally located tang is depressed to its activating position and the light source is illuminated only if the member is held under at least a threshold tension determined by the position of the screw.

Also in the preferred embodiment there are housing means supporting the tang means along a face thereof, the housing having a pair of edges along the face and facing the member whereby the member will bow away from the tang means and toward the pair of housing edges so as to impinge the edges in the absence of sufficient tension on the member whereby to prevent the member from depressing the tang means to the activating position. There are also indicia means for indicating the position of the screw relative to a desired level of tension in the member.

In an alternate embodiment, the indicator means comprises a plurality of light sources; the tang means comprises a plurality of individual tangs each depressible from an extended position toward an associated activating position; the adjustable bias means comprises a plurality of springs connected for biasing respective ones of the tangs towards the extended position; the depression force calibrating means comprises means for setting the force of respective ones of the springs resisting the depression of its associated the tangs to the activating position; and additionally there are a plurality of electrical switches and a battery connected to respective ones of the plurality of light sources, respective ones of the tangs being connected to activate respective ones of the switches when the associated the tang reaches the activating position whereby the light sources individually illuminate to indicate which ones of the tangs have been depressed to their activating position.

DESCRIPTION OF THE DRAWINGS

FIG. 1 is a diagram of the preferred embodiment of the invention.

FIG. 2 is a diagram of an alternative embodiment of the invention.

DESCRIPTION OF THE PREFERRED EMBODIMENT

Referring to FIG. 1, the tensioning gauge 100 of the invention is shown in its preferred embodiment and includes a light-weight durable housing 10 and an indicator light 12. The preferred housing 10 is of one of the tough plastic materials presently available and well known to those skilled in the art. The preferred light 12 is a light emitting diode (LED). The light 12 receives power from a battery 14 through a series circuit comprising a pair of micro-switches 16, 18 connected through a plunger switch 20. The micro-switches 16 and 18 and the plunger switch 20 each include a switch tang 16a, 18a, 20a, respectively extending out from the same face 10a of the housing 10. A circuit is completed between the battery 14 and the light 12 whenever the switch tangs 16a, 18a and 20a are simultaneously depressed toward the housing 10 by a sufficient amount, for example by pressing the housing face 11 toward one side of a saw blade 22. What is desired is form a three point contact with the blade 22 as the gauge 100 is pushed against the blade 22 (or the blade 22 is pulled against the gauge 100) with the curve or bow of the blade 22 thereby being sensed by the outer contacting end of the tang 20a of the plunger 20 which is located equally distant between the outer two contact points, i.e. tips of the tangs 16a, 18a.

The plunger switch 20 is spring-loaded so as to be conductive only with the application of at least a predetermined amount of force on the tang 20a. When the face 11 of the gauge 100 is pressed against the blade 22, the tang 20a will attempt to bow the blade 22 around a curve determined by the outward bias force on the tang 20a. The tension in the blade 22 resists the bowing and imparts a compressive force on the tang 20a which is a direct function of the tension in the blade. It is this resistive force which is sensed by the gauge 100 of the present invention and used to indicate (and thereby adjust) the tension in the blade 22. The amount of outward bias force on the tang 20a is set by rotating a tensioning screw knob 24. Unless the saw blade 22 is held under sufficient tension as indicated by the arrows 26, the blade 22 will elastically bend, as indicated in FIG. 1, so that insufficient force is applied to the plunger switch tang 20a to move the tang 20a far enough to turn on the plunger switch 20. Thus, the light 12 turns on only if the blade 22 is held with a tension exceeding a certain threshold as set into the gauge 100.

To accomplish its adjustable outward biasing force, the plunger switch 20 includes a piston 30 connected to the tang 20a and movable inside a cylinder 32 disposed within the housing 10 and against a spring 34 resting on a washer 36. The position of the washer 36 inside the cylinder 32 is adjusted by a tensioning screw 38 threaded through a hole 39 in the housing 10 and rotatable with the knob 24. The compression of the spring is, therefore, variable by rotating the knob 24. An electrical contact 40 attached to the plunger 30 rides with the plunger 32 towards a stationary electrical contact 42. Whenever the plunger 32 is depressed sufficiently, the contacts 40 and 42 are brought together to electrically connect the two microswitches together and complete the series circuit between the battery 14 and the light 12. The force required to do this is set or changed as desired by rotating the knob 24.

The gauge 100 can be calibrated prior to testing the tension in a certain size band saw blade or the like by first rotating the knob 24 until a marker 46 on the screw 38 coincides with one of a plurality of embossed indicia 50 on a clear glass surface 51 corresponding to the size of the blade to be tested. The knob 24 is then backed off so as to loosen the spring 34 until the light 12 is off and is then re-tightened until the light 12 just turns on. Then, if embossed indicia 50 are present, the position of the marker 46 on the screw 38 should match the corresponding one of the embossed indicia 50. Alternatively, in the absence of the embossed indicia 50 or in order to verify the accuracy of such indicia, the gauge 100 of FIG. 1 can be first pressed against an identical saw blade (in the manner illustrated in FIG. 1) whose tension has already been accurately determined as the desired tension; or, a pre-calibrated commercial force gauge can be pushed against the tang 20a and the spring tension adjusted using the knob 24 to achieve a specific tension force in pounds, or the like, as could be specified by the blade manufacturer once such tensioning tools are being described herein are known by the manufacturers to be generally available.

Once the gauge 100 has been calibrated for testing the tension on a particular type of saw blade, the gauge 100 is pressed against the blade to be tested. The tension under which the blade 22 is held (indicated by the arrows 26) is then decreased until the light 12 turns off and is then increased until the light 12 turns on again. At this point, the tension on the blade 22 is precisely set to the calibrated level.

The foregoing is inherently the most accurate way to ascertain saw blade tension because any slight deviation in blade tension results in a large variation in the lateral displacement of the blade 22 or bowing in response to a given force (applied by the spring 34 through tang 20a). If the blade 22 is not sufficiently tensioned, then it bows so much (as the gauge 100 of FIG. 1 is shown pressed against it) that the plunger 30 is not sufficiently depressed for contacts 40, 42 to meet and light 12 does not turn on. In fact, the blade 22 eventually bows so much if insufficiently tensioned that it bows about the corners 11a, 11b of the housing 10 and never even contacts the tang 20a.

In an alternative embodiment, the moving contact 40 can be eliminated in favor of a second stationary contact 60. As the plunger 30 (which in this embodiment is of a conductive material) moves downward, it eventually touches the two stationary contacts 422 and 60 simultaneously to complete the circuit between the battery 14 and the light bulb 12.

Preferably, the battery 14 is a nine volt transistor battery having one of its two terminals connected to one of the two light bulb terminals through a 100 ohm resistor 70 in the manner illustrated in FIG. 1.

FIG. 2 illustrates another alternative embodiment of the invention in which a plurality of plungers 30 connected individually to a plurality of lights 12 and to a common battery 14 are supported on a corresponding plurality of springs 34 and arranged in a long line on the housing 10. The tension in the blade 22 is found not be varying the tension in the springs 34 but by simply observing how many of the plurality of lights 12 are turned on simultaneously when the gauge 100' of FIG. 2 is pressed against the blade 22. A blade under less tension will bow more and therefore will activate only a few of the lights 12, while a blade under the greatest tension will hardly bow at all and therefore will activate nearly all of the plurality of lights 12 in FIG. 2. One can easily calibrate the number of lights 12 activated against the corresponding tension level by initially testing the gauge 100' against variously tensioned saw blades and noting the number of lights 12 activated for each different blade. One advantage of the embodiment of FIG. 2 is that it is not necessary to change the tension in any of the springs 34 (as it is in the gauge 100 of FIG. 1) to accommodate different desired blade tension levels.

In another variation of the invention, the gauge 100, 100' of FIG. 1 or FIG. 2 may be incorporated as a permanent fixture on the band saw or scroll saw. In this arrangement, one mode of use may be to leave the gauge 100, 100' stationary while moving the saw blade 22 toward the gauge 100, 100' whenever it is desired to check or adjust the blade tension. Alternatively, and prferred for practical reasons, the gauge 100, 100' may be hingedly mounted on an arm or such so that it can be swung out of the way during use of the saw and swung against the blade to test its tension. Of course, it should be apparent to those skilled in the art from the description hereinbefore that the saw tensioning gauge of this invention is useful to tension any linear type of cutting blade including without limitation hack saws, coping saws (of the hand-held variety, for example) and the like. It is similarly useful with V-belts, leather drive belts, chain drive mechanisms, and the like.

Finally, while the indicator has been described as being a light (i.e.LED) or a plurality of lights, it can be any other electrically responsive means within the scope and spirit of the invention. For example, the plurality of tensioned switches comprising the linear array of tangs 30 and springs 34 of FIG. 2 may be electrically connected to an intelligent device which determines how many of the switches are closed using simple electrical techniques. From this, the intelligent device can infer the amount of tension under which the blade 22 is held. With the small computational chips available on the market today, one could use such a chip within the gauge 100, 100' to compute the tension and then display it as, for example, on a liquid crystal display.

Accordingly, while the invention has been described in detail with specific reference to preferred embodiments thereof, other variations and modifications thereof may be made without departing from the spirit and scope of the invention.

Wherefore, having thus described my invention, what is claimed is:

1. A tensioning gauge for measuring the tension under which an elongated flexible member such as a saw blade is held, said tensioning gauge comprising:
   (a) indicator means;
   (b) tang means depressible from an extended position toward an activating position for activating said indicator means when said tang means is depressed to said activating position;
   (c) adjustable bias means for biasing said tang means towards said extended position; and
   (d) depression force calibrating means for adjusting the force required to depress said tang means to said activating position by changing a biasing force of said bias means, whereby said member bows upon being pressed against said tang means so that said tang means is not depressed to its activating position unless said member is held under at least an amount of tension proportional to said biasing force of said bias means.

2. The tensioning gauge of claim 1 wherein:
   said tang means comprises a plurality of linearly aligned tangs individually depressible toward individual activating positions, said indicator means being activated only upon said plurality of tang means being simultaneously depressed to their respective activating positions, said adjustable bias means being connected to a centrally located one of said tangs.

3. The tensioning gauge of claim 2 wherein:
   (a) said bias means comprises a spring having an end abutting said one tang so as to elastically oppose its travel toward its respective activating position; and
   (b) said depression force calibrating means comprises a screw threaded in a stationary housing towards and abutting an opposite end of said spring, whereby the force of said spring against said one tang is adjusted by rotating said screw.

4. The tensioning gauge of claim 3 and further comprising:
   a plurality of electrical switches and a battery electrically connected in series with said indicator means, said plurality of tangs being arranged in a line comprising at least three said tangs with each of said tangs being connected to an activating member of a corresponding one of said plurality of electrical switches.

5. The tensioning gauge of claim 4 wherein:
   said indicator means comprises a single light source connected in series with said battery and said plurality of switches whereby when said member bows upon being pressed against said tang means so as to depress to activating positions at least those individual tangs nearest each end of said line of tangs said centrally located tang is depressed to its activating position and said light source is illuminated only if said member is held under at least threshold tension determined by the position of said screw.

6. The tensioning gauge of claim 3 and further comprising:
   indicia means for indicating the position of said screw relative to a desired level of tension in said member.

7. The tensioning gauge of claim 1 and further comprising:
   housing means supporting said tang means along a face thereof, said housing having a pair of edges along said face and facing said member whereby said member will bow away from said tang means and toward said pair of housing edges so as to impinge said edges in the absence of sufficient tension on said member whereby to prevent said member from depressing said tang means to said activating position.

8. The tensioning gauge of claim 1 wherein:
   (a) said indicator means comprises a plurality of light sources;
   (b) said tang means comprises a plurality of individual tangs each depressible from an extended position toward an associated activating position;
   (c) said adjustable bias means comprises a plurality of springs connected for biasing respective ones of said tangs towards said extended position;
   (d) said depression force calibrating means comprises means for setting the force of respective ones of said springs resisting the depression of its associated said tangs to said activating position; and additionally comprising,
   (e) a plurality of electrical switches and a battery connected to respective ones of said plurality of light sources, respective ones of said tangs being connected to activate respective ones of said switches when the associated said tang reaches said activating position whereby said light sources individually illuminate to indicate which ones of said tangs have been depressed to their activating position.

9. A method for adjusting the tension in a member such a saw blade using a tensioning gauge having an indicator which is activated upon the gauge being pressed against a resistance characterized by at least a threshold force, the gauge including calibrating means for adjusting the threshold force and the member being held in tension-applying means including means for adjusting the tension, the method comprising the steps of:
   (a) operating the calibrating means so that the threshold force corresponds to a desired level of tension in the member; and
   (b) pressing the tensioning gauge and the member together so as to cause the member to bow while,
      (b1) operating the means for adjusting the tension to reduce the tension until the indicating means is not active, and then
      (b2) operating the means for adjusting the tension so as to increase the tension until the indicating means is active.

10. The method of claim 9 wherein:
    (a) the member is characterized by being particularly susceptible of bowing when pressed against along a particular axis; and wherein
    (b) said step of pressing the tensioning gauge and the member together so as to cause the member to bow comprises, (b1) disposing the tension gauge along the particular axis, and then
(b2) pressing the tensioning gauge and the member together with the tension gauge disposed along the particular axis.

11. The method of claim 9 wherein the steps thereof are preceded by the additional step of:
operating the calibrating means so as to set the threshold force to a level at which the indicator means is activated upon the gauge and the member being pressed together whenever the tension equals at least a predetermined amount.

12. A method for adjusting the tension in a member such a saw blade using a tensioning gauge having a plurality of tangs arranged generally in a line and indicator means indicative of the number of the tangs being pressed to an activating position against a resistance characterized by at least a respective threshold force, the member being held in tension-applying means including means for adjusting the tension, the method comprising the steps of:
(a) pressing the tensioning gauge and the member together so as to cause the member to bow; and
(b) observing the indicator means while,
(b1) operating the means for adjusting the tension to reduce the tension until a number less than a selected number of the tangs is pressed against threshold forces to the activating position, and
(b2) operating the means for adjusting the tension so as to increase the tension until the selected number of the tangs are pressed against threshold forces to the activating position.

13. The method of claim 12 wherein:
(a) the member is characterized by being particularly susceptible of bowing when pressed against along a particular axis; and wherein
(b) said step of pressing the tensioning gauge and the member together comprises,
(b1) disposing the tension gauge along the particular axis, and then
(b2) pressing the tensioning gauge and the member together.

14. The method of claim 12 wherein the steps thereof are preceded by the additional step of:
adjusting the threshold for each one of the plurality of tangs so that the selected number of tangs are pressed by the threshold force to the activating position upon the gauge and the member being pressed together whenever the tension equals at least a predetermined amount.

15. A gauge for measuring the tension in a longitudinal bowable member under tension comprising:
(a) a plurality of resiliently depressible tangs disposed along a straight line which depress to conform to the contour of the member when the member and said tangs are pressed together with the tangs disposed longitudinally along the member and perpendicular thereto; and,
(b) indicator means for indicating when said tangs have been depressed to a curve which is closer to a straight line than a pre-established curve threshold.

16. The tension measuring gauge of claim 15 wherein there are three said tangs and said indicator means comprises a single lamp, and additionally comprising:
(a) three normally open switches connected to respective ones of said tangs to be closed when the associated said tang is depressed to a preestablished activating position;
(b) a battery electrically connected in series with said switches and said lamp; and
(c) adjustable bias means connected for applying an outward bias force to an extended position opposite said activating position to a middle one of said tangs.

17. The tension measuring gauge of claim 16 and additionally comprising:
adjusting means for adjusting said outward bias force of said bias means to selectable level corresponding to a desired tension level in the member.

18. The tension measuring gauge of claim 15 wherein there are at least five of said tangs and said indicator means comprises a plurality of lamps corresponding to respective ones of said tangs, and additionally comprising:
(a) a plurality normally open switches connected to respective ones of said tangs to be closed when the associated said tang is depressed to a preestablished activating position;
(b) a battery electrically connected in series with respective ones of pairs comprising ones of said switches and a said lamp associated therewith; and
(c) a plurality of bias means connected for applying an outward bias force to an extended position opposite said activating position to respective ones of said tangs.

* * * * *